UNITED STATES PATENT OFFICE.

HENRY MALONE JETER, OF OPELIKA, ALABAMA.

IMPROVEMENT IN PROCESSES AND COMPOUNDS FOR PRESERVING FOOD.

Specification forming part of Letters Patent No. 203,737, dated May 14, 1878; application filed April 2, 1878.

*To all whom it may concern:*

Be it known that I, HENRY MALONE JETER, of Opelika, in the county of Lee and State of Alabama, have invented a new and useful Compound, which compound is fully described in the following specification:

This compound or invention relates to that class of compounds used for preserving fruits and vegetables pure and fresh in open vessels without being hermetically sealed.

Take of sulphur, pulverized, four ounces; charcoal, pulverized, two ounces; sugar, one dram; water, eight gallons.

The water must be saturated with the gas generated by the burning of the other ingredients in any way ingenuity may devise. A convenient and cheap mode is here suggested.

Put the water in a common air-tight barrel. Put the other ingredients in any iron vessel or ladle, as a skillet or spider. Heat these until the materials begin to burn with a flame. Then place them in the barrel upon a bracket or board above the water. Spread a cloth or paper over the barrel and replace the head of the barrel, so as to retain the gas generated by the burning ingredients. Let the vessel or barrel stand closed about two hours, that the gas may become entirely absorbed by the water. Then add, for vegetables and fruits, one dram alum previously dissolved in eight ounces water. The articles to be preserved are then placed in this mixture, and without hermetically sealing them will keep perfectly sound and fresh in taste from one season until another.

Having thus described my invention and the manner of compounding and using the same, what I claim as new and useful, and desire to secure by Letters Patent of the United States, is—

1. The process of preserving fruits and vegetables, which consists in immersing them in a solution of alum which has been impregnated with the vapors resulting from the burning of a mixture of sulphur, charcoal, and sugar, substantially as set forth.

2. A composition for preserving fruits and vegetables, consisting of a solution of alum in water which has been charged with the vapors resulting from the burning of a mixture of sulphur, charcoal, and sugar, as and for the purpose set forth.

HENRY MALONE JETER.

Witnesses:
A. A. SCOTT,
W. H. FITTS.